United States Patent [19]

Adachi

[11] Patent Number: 4,905,149

[45] Date of Patent: Feb. 27, 1990

[54] METHOD OF DETERMINING DESIRED IMAGE SIGNAL RANGE

[75] Inventor: Yuuma Adachi, Kaisei, Japan

[73] Assignee: Fuji Photo Film Co., Ltd., Kanagawa, Japan

[21] Appl. No.: 234,861

[22] Filed: Aug. 22, 1988

[30] Foreign Application Priority Data

Aug. 20, 1987 [JP] Japan .................. 62-207212

[51] Int. Cl.⁴ .................. G06F 15/68; G06F 15/62; G03B 42/02; A61B 6/00
[52] U.S. Cl. .................. 364/414.13
[58] Field of Search .................. 250/327.2, 484.1; 364/413.13

[56] References Cited

U.S. PATENT DOCUMENTS

| 4,527,060 | 7/1985 | Suzuki et al. | 250/327.2 |
| 4,682,028 | 7/1987 | Tanaka et al. | 250/327.2 |
| 4,804,842 | 2/1989 | Nakajima | 250/327.2 |

FOREIGN PATENT DOCUMENTS

| 0170270 | 2/1986 | European Pat. Off. | 350/327.08 |
| 0163806 | 8/1982 | Japan . | |
| 0039842 | 2/1987 | Japan . | |

Primary Examiner—Clark A. Jablon

Attorney, Agent, or Firm—Sughrue, Mion, Zinn, Macpeak & Seas

[57] ABSTRACT

In order to determine a desired image signal range in image signals carrying an image having an object image portion and a pair of empty image portions separated by the object image portion, the image signals carrying the image are binary-coded into object image portion corresponding signals and empty image portion corresponding signals on the basis of a predetermined threshold value, and a binary-coded image consisting of an object image portion corresponding part carried by the object image portion corresponding signals and two empty image portion corresponding parts carried by the empty image portion corresponding signals and separated by the object image portion corresponding part is formed. The binary-coding step and the binary-coded image forming step are repeated while the value of the predetermined threshold is gradually lowered until the two empty image portion corresponding parts are united into a united empty image portion corresponding part, and the desired image signal range is determined on the basis of the image signals carrying the picture elements included in the united empty image portion corresponding part at the time the two empty image portion corresponding parts are united.

1 Claim, 2 Drawing Sheets

METHOD OF DETERMINING DESIRED IMAGE SIGNAL RANGE

BACKGROUND OF THE INVENTION

1. Field of the Invention

This invention relates to a method of determining, on the basis of a histogram of image signals carrying an image recorded on a recording medium such as a stimulable phosphor sheet, a desired image signal range, that is, a range of the image signals corresponding to a part of the image which is necessary for a diagnosis or the like.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to an electric image signal, image processing is carried out on the electric image signal, and the radiation image of the object is reproduced as a visible image by use of the processed image signal on a recording medium such as a photographic film, a display device such as a cathode ray tube (CRT), or the like.

There are many cases where only a part of the recorded image is necessary. For example, in the case of recording of the human cervical region, the recorded image is as shown in FIG. 3. In the recorded image, only image information on the cervical vertebrae A and the soft part around the cervical vertebrae is generally necessary and image information on the other parts, that is, the empty image portion B where the radiation directly impinges upon the stimulable phosphor sheet and the image signal level is the highest, the chin portion C and the shoulder portion D, are not necessary. In such a case, it is preferred that the whole image be not reproduced as a visible image but only a part of the image corresponding to the cervical vertebrae A and the soft part thereabout which is necessary for the diagnosis be selectively reproduced within a predetermined density range suitable for viewing for a given diagnostic purpose, thereby improving the contrast and resolution.

In accordance with the method proposed in U.S. Pat. No. 4,527,060 in order to satisfy the demand, a preliminary read-out (A read-out operation for ascertaining the image information of a radiation image stored on the stimulable phosphor sheet which is carried out in advance by use of stimulating rays having stimulation energy of a level lower than the level of the stimulation energy of stimulating rays used in a final read-out operation for obtaining a visible image for viewing, particularly for diagnostic purposes, as described in U.S. Pat. No. 4,527,060 is first carried out and a histogram of the image signals (image signal level) obtained by the preliminary read-out is then obtained. At the same time, the maximum image signal level Smax and the minimum image signal level Smin of a desired image signal range in the histogram are calculated, and the read-out conditions for the final read-out are adjusted so that the maximum image signal level Smax and the minimum image signal level Smin correspond respectively to the maximum signal level Qmax and the minimum signal level Qmin of a desired input signal range in an image processing means which are determined by the maximum density Dmax and the minimum density Dmin of the correct density range in the reproduced visible image. Thereafter said final read-out is carried out on the basis of the read-out conditions thus determined.

Further, it may be possible to satisfy the demand by obtaining a histogram of the image signals (image signal level) obtained by the preliminary read-out, calculating the maximum image signal level Smax and the minimum image signal level Smin of a desired image signal range in the histogram, adjusting the gradation processing conditions so that the maximum image signal level Smax and the minimum image signal level Smin correspond respectively to the maximum signal level Qmax and the minimum signal level Qmin of a desired input signal range in an image reproducing means (visible image output means) which are determined by the maximum density Dmax and the minimum density Dmin of the correct density range in the reproduced visible image and carrying out the gradation processing according to the gradation processing conditions thus determined.

In this method, the image signals obtained by the final read-out may be used instead of the image signals obtained by the preliminary read-out. Also in this case, a histogram of the image signals are first obtained and then said Smax and Smin are calculated and the gradation processing conditions are determined so that the Smax and Smin respectively correspond to said Rmax and Rmin.

By the term "read-out conditions" as used herein are meant various conditions affecting the relationship between the input (quantity of light emitted by the stimulable phosphor sheet upon stimulation) and the output (electric image signal level) of the photoelectric read-out means, e.g., the read-out gain (sensitivity) determining the relationship between the input and the output, the scale factor (latitude) and the level of the stimulating used in the read-out.

By the term "image processing conditions" as used herein are meant various conditions affecting the relationship between the input to the image processing means and the output thereof, for example, gradation processing conditions and frequency response processing conditions.

As mentioned above, the level of the stimulating rays used in the preliminary read-out is adjusted to be lower than the level of the stimulating rays used in the final read-out. That is, the effective energy of the stimulating rays which the stimulable phosphor sheet receives per unit area in the preliminary read-out is adjusted to be lower than the effective energy of the stimulating rays used in the final read-out.

In order to carry out the methods described above, the desired image signal range, that is, the Smax and Smin must be appropriately determined. However, in the method disclosed in Japanese Unexamined Patent Publication No. 60(1985)-156055, the desired image signal range in a given histogram is roughly determined referring to the pattern of the histogram which depends upon the image recording portion of the object and/or the image recording method to a certain extent, and the Smax and Smin within the desired image signal range are determined on the basis of an appropriate frequency threshold value. Accordingly, the values of the Smax and Smin obtained in accordance with the method are only just appropriate and cannot be sufficient.

That is, the image signal histogram of the whole human cervical region image is as shown in FIG. 1, and if the desired image portion includes the chin and shoulder portion I, the cervical vertebrae II and the soft part III such as skin, and occupies almost the whole area of the histogram except the empty image portion IV which can be clearly distinguished on the basis of the form of the histogram, that is, if no unnecessary image portion exists on the lower level side of the desired image portion, the maximum image signal level Smax and the minimum image signal level Smin of the desired image signal range carrying the desired image portion can be substantially appropriately determined by the use of an appropriate frequency threshold value set on the basis of the form of the histogram. However, in the case that the desired image portion includes only the cervical vertebrae II and the soft part III and unnecessary image portion such as the chin and shoulder portion I exists on the lower level side of the desired image portion, it is difficult to appropriately determine the Smax and Smin by such a method in which the Smax and Smin are simply determined from the histogram of the whole image by the use of a predetermined frequency threshold value.

SUMMARY OF THE INVENTION

In view of the foregoing observations and description, the primary object of the present invention is to provide a method of determining the desired image signal range which can appropriately determine the desired image signal range carrying the desired image portion even if an unnecessary image portion the signal level of which is lower than that of the desired image portion is included in the whole image.

In accordance with the present invention, there is provided a method of determining a desired image signal range in image signals carrying an image having an object image portion and a pair of empty image portions separated by the object image portion, comprising steps of binary-coding the image signals carrying the image into object image portion corresponding signals and empty image portion corresponding signals on the basis of a predetermined threshold value, forming a binary-coded image consisting of an object image portion corresponding part carried by the object image portion corresponding signals and two empty image portion corresponding parts carried by the empty image portion corresponding signals and separated by the object image portion corresponding part, repeating the binary-coding step and the binary-coded image forming step while the value of said predetermined threshold is gradually lowered until the two empty image portion corresponding parts are united into a united empty image portion corresponding part, and determining the desired image signal range on the basis of the image signals carrying the picture elements included in the united empty image portion corresponding part at the time the two empty image portion corresponding parts are united.

In this specification, the expression "determining a desired image signal range" should be interpreted to include not only a case where both the maximum image signal level Smax and the minimum image signal level Smin of the desired image signal range, but also a case where one of the Smax and Smin is determined. For example, one of the Smax and Smin may be determined in accordance with the method of the present invention and the other may be determined in accordance with other methods.

By the term "object image portion corresponding signals" as used herein is meant the image signals the level of which before the binary-coding is not higher than the predetermined threshold value, and by the term "empty image portion corresponding signals" as used herein is meant the image signals the level of which before the binary-coding is higher than the predetermined threshold value. The sum of the object image portion corresponding signals and the empty image portion corresponding signals is the image signals of the whole image. That is, since the image signals carrying the object image portion are on the lower level side and the image signals carrying the empty image portion are on the higher level side, the image signals on the lower side of the threshold value is referred to as the object image portion corresponding signals and the image signals of the higher side of the threshold value is referred to as the empty image portion corresponding signals.

The expression "determining the desired image signal range on the basis of the image signals carrying the picture elements included in the united empty image portion corresponding part at the time the two empty image portion corresponding parts are united" should be broadly interpreted to determine the desired image signal range utilizing such image signals. For example, the desired image signal range may be determined on the basis of a histogram of the image signals carrying the picture elements included in the united empty image portion corresponding part at the time the two empty image portion corresponding parts are united, or on the basis of the maximum image signal level Smax and the minimum image signal level in the same image signals.

In the case of images having an object image portion at an intermediate portion and a pair of empty image portions on opposite sides of the object image portion like the aforesaid human cervical region image, a binary-coded image consisting of an object image portion corresponding part and a pair of empty image portion corresponding parts separated by the object image corresponding part can be formed by binary-coding the image signals carrying the image on the basis of a predetermined threshold value.

Considering that the radiation directly impinges upon the stimulable phosphor sheet at the empty image portion and accordingly the image signal level is generally the highest at the empty image portion, the formation of the binary-coded image can be easily and surely carried out, for instance, by adopting, as said predetermined threshold value, a value obtained by subtracting a certain value from the maximum image signal level in the image signals of the whole image.

When repeating formation of the binary-coded image while the threshold value is gradually lowered, the area of the empty image portion corresponding part is gradually enlarged with part of the object image portion corresponding part being gradually merged into the empty image portion corresponding part in order of the order of the image signal level. In the case that the desired image portion is in direct contact with the two empty image portions as in the image shown in FIG. 3 where the desired image portion comprises the cervical vertebrae and the soft part therearound, the two empty image portion corresponding parts are gradually enlarged to be finally united into a single united empty image portion corresponding part as the threshold value is lowered. For example, in the case of the image shown in FIG. 3, the soft part and the cervical vertebrae are gradually merged into the empty image portion corresponding parts to finally bridge the two parts as the threshold value is gradually lowered.

The united empty image portion corresponding part includes, in addition to the empty image portion, the cervical vertebrae image portion and the soft part image portion which form the desired image portion, but does not include the chin image portion and the shoulder image portion which are lower than the desired image portion in the signal level and form the unnecessary image portion. That is, the image signals of the united empty image portion corresponding part at the time said two separate empty image portion corresponding parts are united, includes all the image signals except the image signals carrying the unnecessary image portion. Accordingly, by determining the desired image signal range o the basis of the image signals carrying the picture elements included in the united empty image portion corresponding part at the time the two empty image portion corresponding parts are united, the desired image signal range can be determined without disturbance by the image signals carrying the unnecessary image portion.

DESCRIPTION OF THE PREFERRED EMBODIMENT

An embodiment of the present invention which is applied to determination of a desired image signal range in the case that the human cervical region is recorded on a stimulable phosphor sheet will be described, hereinbelow. In this embodiment, the desired image portion in the recorded image is the cervical vertebrae image portion and the soft part image portion therearound and the desired image signal range is the range of the image signals carrying the desired image portion.

Figure 3:
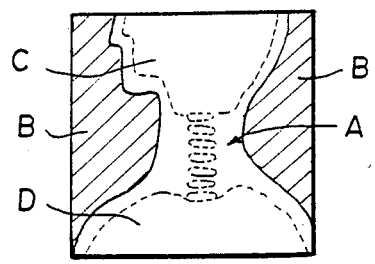
FIG. 3 is a view showing a radiation image of the human cervical region.

The preliminary read-out is carried on the stimulable phosphor sheet on which the human cervical region has been recorded, thereby obtaining preliminary read-out image signals carrying the recorded image. That is, the stimulable phosphor sheet is scanned by stimulating rays for the preliminary read-out, and light emitted by the sheet upon stimulation is converted by a photoelectric convertor into electric image signals representing the light quantity emitted from the respective scanning spots (picture elements) on the sheet. The radiation image formed on the basis of the electric image signals is as shown in FIG. 3.

Then by binary-coding the image signals carrying the image into object image portion corresponding signals and empty image portion corresponding signals on the basis of a predetermined threshold value, a binary-coded image consisting of an object image portion corresponding part carried by the object image portion corresponding signals and two empty image portion corresponding parts carried by the empty image portion corresponding signals and separated by the object image portion corresponding part is formed.

Figure 2:
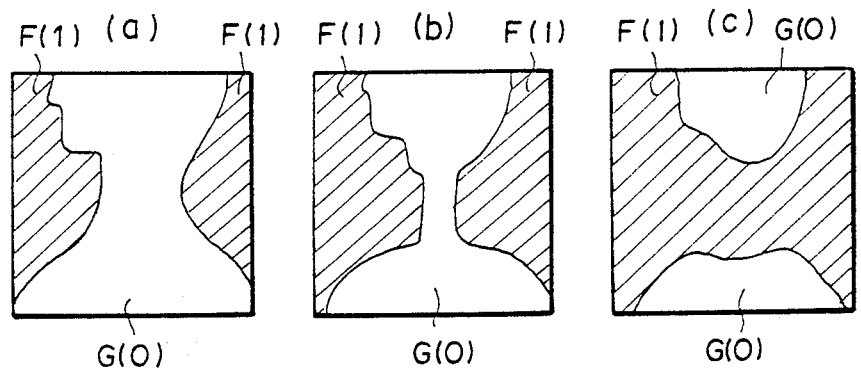

The binary-coded image thus obtained is shown in FIG. 2a. In FIG. 2a, the nonhatched portion is the object image portion corresponding part G the image signals of which are encoded as 0 and the hatched portions are the empty image portion corresponding parts F the image signals of which are encoded as 1.

The predetermined threshold value may be such as will provide a binary-coded image consisting of an object image portion corresponding part G and a pair of empty image portion corresponding parts F separated from each other by the object image portion corresponding part G. For example, when the image signals carrying the cervical region image shown in FIG. 3 is binary-coded with a signal level near the boundary of the soft part image portion III and the empty image portion IV in the image signal histogram (image signal S1 to S2) shown by the solid line in FIG. 1 employed as the predetermined threshold value Th, a binary-coded image substantially conforming to the image shown in FIG. 3 is obtained as shown in FIG. 2a. However, the threshold value need not be limited to a value near the boundary, but may be of other values in the image signal range of the empty image portion IV. Further, when the minimum image signal of the image signal range of the cervical vertebrae image portion is assumed to be Smin (FIG. 1), the threshold value may be of other values higher than Smin.

The threshold value may be between the Smin and S2. Since the range is, however, too wide and the width of the range (Smin to S2) or the width of the empty image signal range carrying the empty image portion IV can be empirically known to a certain extent, setting of the threshold value can be facilitated by obtaining the maximum signal level S2 of the whole image signals and by employing as the threshold value a value obtained by subtracting from the maximum signal level S2 a certain value which has been empirically known to give a remainder in the range of Smin to S2, e.g., a value substantially corresponding to the width of the image signal range carrying the empty image portion IV.

After formation of the initial binary-coded image, similar binary-coded images are repeatedly formed while the threshold value is gradually lowered. As the threshold value is lowered, the area of the empty image portion corresponding parts is gradually enlarged, and for example, when the threshold value is lowered near the boundary of the cervical vertebrae image portion II and the soft part image portion III, the object image portion corresponding part G is merged into the empty image portion corresponding parts F up to the soft part image portion III and a binary-coded image as shown in FIG. 2b is obtained. As the threshold value is further lowered to the minimum image signal level of the image signals carrying the cervical vertebrae image portion, the cervical vertebrae image portion is completely merged into the empty image portion corresponding parts F and the two empty image portion corresponding parts F are united into a single empty image portion corresponding part as shown in FIG. 2c.

That is, at the time, the two empty image portion corresponding parts F are united, the cervical vertebrae image portion and the soft part image portion which form the desired image portion are completely merged into the united empty image portion corresponding part, while the chin image portion and the shoulder image portion which form the unnecessary image portion are outside the united empty image portion corresponding part F.

Then the image signals carrying the picture elements included in the united empty image portion corresponding part at the time the two empty image portion corresponding parts are united are extracted, an image signal histogram of the extracted image signals is formed and the maximum image signal level Smax and the minimum image signal level Smin of the desired image signal range are determined on the basis of the image signal histogram.

Figure 1:
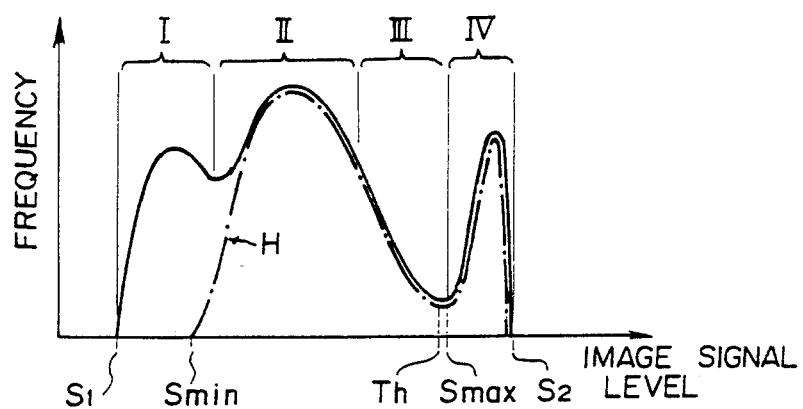
FIG. 1 is a view showing an example of an image signal histogram of the image of the human cervical region shown in FIG. 3, FIGS. 2a to 2c are views respectively showing binary-coded images obtained from the radiation image shown in FIG. 3 on the basis of different threshold values.

The histogram is as shown by chain line H in FIG. 1, and includes the image signals carrying the desired image portion, i.e., the cervical vertebrae image portion and the soft part image portion but does not include the image signals carrying the unnecessary image portion, i.e., the chin image portion and the shoulder image portion. Accordingly, the minimum image signal level in the histogram H is substantially equal to the minimum image signal level in the image signals carrying the cervical vertebrae image portion. Therefore, on the basis of the histogram H, the minimum image signal level Smin in the desired image signal range carrying the desired image portion which is difficult to determine in accordance with the method where the desired image signal range is determined on the basis of a histogram of the whole image signals.

The maximum image signal level Smax and the minimum image signal level Smin may be determined in various suitable manners on the basis of the histogram H. For example, the minimum image signal level in the histogram H may be adopted as the minimum image signal level Smin in the desired image signal range. Further, since the empty image portion clearly appears in the histogram H, the image signal level at the boundary of the empty image portion which may be obtained in the conventional method may be adopted as the maximum image signal level Smax in the desired image signal range.

Another embodiment of the present invention which is applied to determination of a desired image signal range in the case that the human abdomen is recorded on a stimulable phosphor sheet will be described, hereinbelow.

Figure 4:
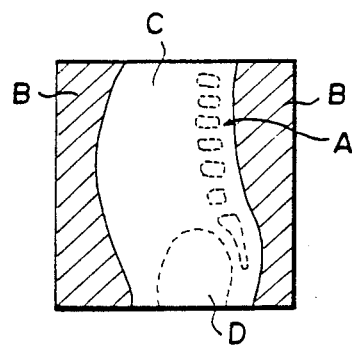
FIG. 4 is a view showing a radiation image of the human chest.

In FIG. 4 which shows an example of a radiation image of the human abdomen, reference symbol A denotes a thoracic-lumber vertebrae image portion, reference symbol B denotes an empty image portion, reference symbol C denotes a soft part (e.g., the internal organs) image portion and reference symbol D denotes a pelvis image portion. There two empty image portions B on opposite sides of the object image portion consisting of the image portions A, C and D.

Figure 5:
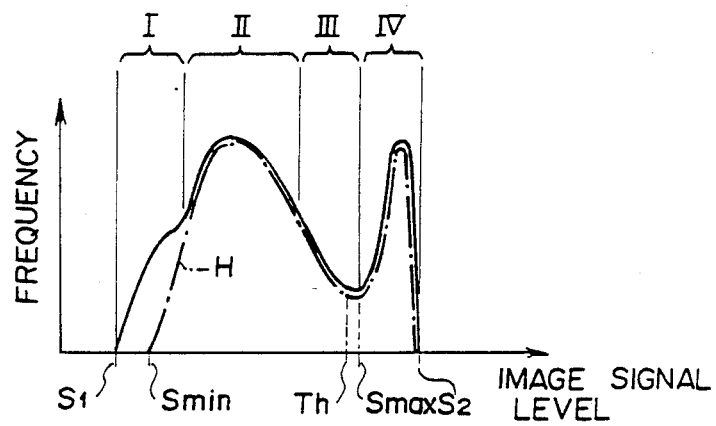
FIG. 5 is a view showing an example of an image signal histogram of the image of the human chest shown in FIG. 4, and FIGS. 6a to 6c are views respectively showing binary-coded images obtained from the radiation image shown in FIG. 4 on the basis of different threshold values.

FIG. 5 shows an image signal histogram of the image signals carrying the whole image shown in FIG. 4, and I in FIG. 5 corresponds to the pelvis image portion, II corresponds to the thoracic-lumber vertebrae image portion, III corresponds to the soft part image portion and IV corresponds to the empty image portion.

In this embodiment, the desired image portion in the recorded image consists of the thoracic-lumber vertebrae image portion II and the soft part image portion III and the unnecessary image portion consists of the pelvis image portion I the image signal level of which is lower than that of the desired image portion.

Also in this embodiment, the preliminary read-out is carried on the stimulable phosphor sheet on which the human abdomen has been recorded, thereby obtaining preliminary read-out image signals carrying the recorded image. Then by binary-coding the image signals carrying the image into object image portion corresponding signals and empty image portion corresponding signals on the basis of a predetermined threshold value (Th), a binary-coded image consisting of an object image portion corresponding part carried by the object image portion corresponding signals and two empty image portion corresponding parts carried by the empty image portion corresponding signals and separated by the object image portion corresponding part is formed.

Figure 6:
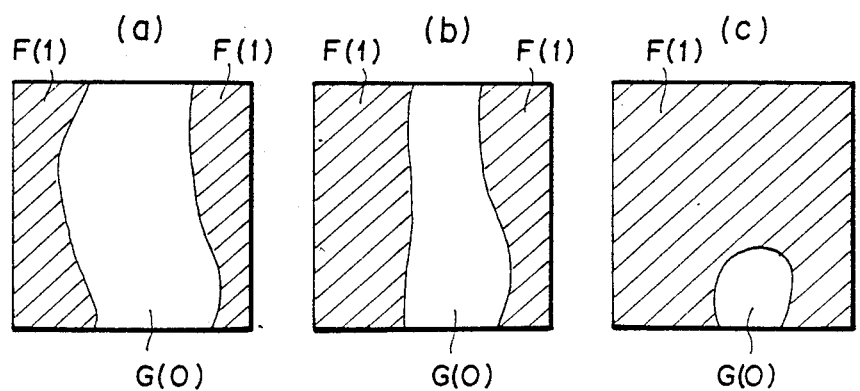

The binary-coded image thus obtained is shown in FIG. 6a. In FIG. 6a, the nonhatched portion is the object image portion corresponding part G the image signals of which are encoded as 0 and the hatched portions are the empty image portion corresponding parts F the image signals of which are encoded as 1.

After formation of the initial binary-coded image, similar binary-coded images are repeatedly formed while the threshold value is gradually lowered. As the threshold value is lowered, the area of the empty image portion corresponding parts is gradually enlarged, and for example, when the threshold value is lowered near the boundary of the thoracic-lumber vertebrae image portion II and the soft part image portion III, the object image portion corresponding part G is merged into the empty image portion corresponding parts F up to the soft part image portion III and a binary-coded image as shown in FIG. 6b is obtained. As the threshold value is further lowered to the minimum image signal level of the image signals carrying the thoracic-lumber vertebrae image portion, the thoracic-lumber vertebrae image portion is completely merged into the empty image portion corresponding parts F and the two empty image portion corresponding parts F are united into a single empty image portion corresponding part as shown in FIG. 6c.

That is, at the time, the two empty image portion corresponding parts F are united, the thoracic-lumber vertebrae image portion and the soft part image portion which form the desired image portion are completely merged into the united empty image portion corresponding part, while the pelvis image portion which forms the unnecessary image portion is outside the united empty image portion corresponding part F.

Then the image signals carrying the picture elements included in the united empty image portion corresponding part at the time the two empty image portion corresponding parts are united are extracted, an image signal histogram of the extracted image signals is formed and the maximum image signal level Smax and the minimum image signal level Smin of the desired image signal range are determined on the basis of the image signal histogram (chain line H in FIG. 5).

In either of the embodiments described above, the Smax and Smin of the desired image signal range need not be determined on the basis of a histogram of the image signals carrying the picture elements included in the united empty image portion corresponding part at the time the two empty image portion corresponding parts are united, but may be determined on the basis of the maximum image signal level and/or the minimum image signal level (This is equal to said predetermined threshold value at the time the two empty image portion corresponding parts F are united.) in the same image signals. In the latter case, the maximum image signal level or the minimum image signal level may be adopted as the Smax or Smin as they are, or a value obtained by adding a certain value to the maximum image signal level or the minimum image signal level, subtracting a certain value from the same or multiplying the same by a certain value may be adopted as the Smax or Smin.

Though, in the embodiments described above, the present invention is applied to the preliminary read-out image signals, the present invention may be applied to the final read-out image signals or may be applied to even image signals read out from a recording medium other than the stimulable phosphor sheet.

The desired image signal range thus determined may be used for determining the read-out conditions, the image processing conditions and the like, and for other various purposes.

Further, the present invention may be also applied to various images other than the cervical region image and the abdomen image so long as the image satisfies all the following conditions.

1. The image has an object image portion and a pair of empty image portions separated by the object image portion.

2. There is an unnecessary image portion the image signal level of which is lower than that of the desired image portion.

3. The desired image portion is in direct contact with both the empty image portions.

I claim:

1. A method of determining a desired image signal range in image signals carrying an image having an object image portion and a pair of empty image portions separated by the object image portion, comprising steps of:

binary-coding the image signals carrying the image into object image portion corresponding signals and empty image portion corresponding signals on the basis of a predetermined threshold value, forming a binary-coded image consisting of an object image portion corresponding part carried by the object image portion corresponding signals and two empty image portion corresponding parts carried by the empty image portion corresponding signals and separated by the object image portion corresponding part, repeating the binary-coding step and the binary-coded image forming step while the value of said predetermined threshold is gradually lowered until the two empty image portion corresponding parts are united into a united empty image portion corresponding part, and determining the desired image signal range on the basis of the image signals carrying the picture elements included in the united empty image portion corresponding part at the time the two empty image portion corresponding parts are united.

* * * * *